United States Patent Office 3,140,976
Patented July 14, 1964

3,140,976
QUATERNARY AMMONIUM GERMICIDE
Donald J. Berenschot, Chicago, Elmer G. King, Aroma Park, Robert K. Stubbs, Bourbonnais, and George R. Bobalik, Kankakee, Ill., assignors, by mesne assignments, to Armour Pharmaceutical Co., a corporation of Delaware
No Drawing. Filed Dec. 16, 1960, Ser. No. 76,100
1 Claim. (Cl. 167—22)

This invention relates to combinations of amines and quaternary ammonium compounds which are effective in controlling heterogeneous types of organisms found in water systems.

The elimination of algae, bacteria and fungi is essential in some water systems such as swimming pools and such control is highly desirable in cooling water systems and fuel oil storage facilities.

Chlorine and bromine are commonly used in swimming pools to inhibit or destroy microorganisms occurring in pool water. These commonly used sanitizers, however, have many notable deficiencies. They are quite irritating to skin and eyes of swimmers; they are undesirably volatile and thus rapidly expended; and they are relatively ineffective against certain commonly occurring organisms. Water having chlorine concentrations much above 1.0 p.p.m. is generally considered to be too iritating for use in swimming pools.

Slime and acid producing organisms frequently encountered in the water of cooling systems and cooling towers often create troublesome situations. Microorganisms of this type may develop during recirculation of the cooling water and produce slimy sludge which coats the cooling system, causing a decrease in efficiency of heat transfer and impaired circulation of the coolant because of clogged controls and valves. In addition to the slime formers, other organisms, especially sulfate reducing bacteria, create acidic conditions in refrigeration systems which lead to metal corrosion and the creation of unstable conditions in cement contacting the acidic coolants. Various quaternary ammonium compounds have been used to control the growth of bacteria but at low concentrations these compounds are ineffective against certain organisms, and in addition tend to produce copious foaming which is most undesirable in cooling systems.

Bacterial growth in the water bottoms of engine fuel storage tanks creates serious operating difficulties in the engines powered by such fuels. Various types of bacteria develop in the water phase of a stored fuel mixture and then migrate into the hydrocarbon phase. During operation of engines powered by these fuels efficiency is impaired by the blockage of fuel filters and inoperability of fuel gauges.

Accordingly, the primary object of this invention is to provide synergistic combinations of nitrogenous compounds which are effective at low concentrations in aqueous fluids for controlling growth of a broad range of algae, bacteria and fungi. Another object is to provide non-toxic and low foaming germicidal compositions. A further object it to supply germicides which act as corrosion inhibitors in addition to combating the development of conditions conducive to corrosion.

To attain these objects this invention provides synergistic combinations of an alkyl primary amine salt having from about 10 to 18 carbons, a quaternary ammonium salt having at least one alkyl group containing from 10 to 18 carbons, and a quaternary ammonium salt having at least 1 alkyl group containing from 10 to 18 carbons and containing from 2 to about 25 moles of an alkylene oxide substituent of from 2 to 4 carbons. These synergistic combinations are surprisingly effective against algae, bacteria and fungi at low concentrations. At effective concentrations they are relatively non-toxic and non-irritating, odorless, colorless, low-foaming, resistant to inactivation by common impurities such as organic matter and water hardness, and are highly stable and long acting non-volatile preparations.

The first component of our combination is an alkyl primary amine salt having from about 10 to 18 carbons in the alkyl chain. Various salts such as the hydrochloride, acetate, nitride, sulfate, hydrobromide and hydroiodide may be used, although we ordinarily prefer to use the hydrochloride salt.

The following primary amines are examples of those useable in the first component: decylamine hydrochloride, hendecylamine acetate, dodecyclamine nitrite, tridecylamine hydrochloride, tetradecylamine hydrochloride, pentadecylamine hydrochloride, hexadecylamine hydrochloride, heptadecylamine hydrochloride and octadecylamine hydrochloride. Blends of suitable amines having their alkyl substituents derived from naturally occurring materials such as coconut oil, palm oil, soybean oil, lard oil, tallow and marine oils may also be prepared for use in the combinations. Optimally we use dodecylamine hydrochloride as the first component of our combinations.

As the second component of our germicidal combinations, we supply a quaternary ammonium salt having at least 1 alkyl group, the alkyl group having from about 10 to 18 carbons. For general usage the anion portion of this salt may be the chloride. We have discovered that combinations contained quaternary ammonium salts having alkyl groups of longer chain length, such as those derived from tallow, have unexpectedly high germicidal activity. Quaternary ammonium salts containing benzyl radicals, or having substituents derived from various fats and oils such as soybean, or having various anion substituents such as methyl sulfate, are also among those compounds suitable for incorporation as the second component of the combinations.

As the third component of the combination we supply a quaternary ammonium salt having at least 1 alkyl group of from 10 to 18 carbons which additionally contains from about 2 to 25 moles of an alkylene oxide having 2 to 4 carbons. We prefer that these compounds contain 2 to 10 moles of propylene oxide or ethylene oxide. Various anions such as the chlorides may be utilized in this component, but methyl sulfate is usually preferred.

Under conditions in which corrosion is a problem nitrate salts of the components may be supplied to prepare combinations useful in preventing the development of corrosion conditions.

The extraordinary microorganisms inhibitory effects may be realized over a broad range of component concentrations but we find especially good results are obtained when 5 parts of the alkylene oxide quaternary compound are blended with 1 to 10 parts of the alkyl amine salt and about 1 to about 10 parts of the quaternary ammonium salt. For general use we find a highly suitable preparation may be prepared by blending equal parts by weight of the components.

It has been found that blending may be easily accomplished by dissolving or dispersing the alkylamine salt in water and adding the other two components, preferably in isopropanol, in suitable quantities to attain a final concentration which is not so high as to cause undesirable viscosity in stock preparations. The combinations usually become undesirably viscous at concentrations above 72% active ingredients.

The combinations, although unexpectedly effective germicides at low concentration, display very low oral toxicity. The combinations have substantially lower toxicity than would be expected from the components they contain. For example, trimethylhydrogenated-tallowammonium chloride alone has an oral toxicity in mice of approximately 550 mg. maximum tolerated dose per kg. body weight; a combination of equal parts by weight of trimethylquaternary, dodecylamine hydrochloride and octadecylmethyldipolyoxypropylene ammonium methylsulfate has a maximum tolerated dose of over 1600 mg. per kg. body weight.

In addition to their surprisingly low toxicity, the combinations are essentially non-foaming at effective concentrations although it is well-known that quaternaries have high foaming properties.

Concentrations, specific combination components and conditions of use for our combinations will vary widely depending upon the particular application and circumstances encountered, but we have, for example, found that the addition of one part of the combination, having an active concentration of about 36%, in 80,000 parts of swimming pool water acts to effectively destroy practically all types of microorganisms ordinarily found in swimming pool water.

The following examples are given only to aid in understanding the invention and it is to be understood that this invention is not restricted to the particular materials, proportions or procedures set forth therein:

EXAMPLE I

Equal parts of dodecylamine hydrochloride, methyl, hydrogenatedtallow di - (2 - hydroxypropyl)ammonium methylsulfate and trimethyltallow ammonium chloride were combined; minimal inhibitory concentrations were determined in p.p.m. and effectiveness of the combination was compared to the individual components. Readings for bacteria were made after serial tube dilutions had been incubated at 37° C. for 24 hours after the first being held at room temperature for 24 hours; readings for fungi were made after 72 hours at room temperature.

*Table 1*

| Preparation | Bacteria | | | | Fungi | | | |
|---|---|---|---|---|---|---|---|---|
| | M. pyogenes | B. cereus | E. coli | Salmonella | A. niger | C. albicans | M. canis | T. cremoris |
| (1) Dodecylamine HCl | 7.8 | 15.7 | 15.7 | 15.7 | 12.5 | 12.5 | 12.5 | 12.5 |
| (2) Methylhydrogenatedtallowdihydroxypropyl ammonium methylsulfate | 2.0 | 2.0 | 15.7 | 15.7 | 31.3 | 0.39 | 1.0 | 0.5 |
| (3) Trimethyltallow ammonium chloride | 0.5 | 1.0 | 7.8 | 31.3 | 15.7 | 0.25 | 2.0 | 0.125 |
| Combination | 0.28 | 1.125 | 4.5 | 4.5 | 9.0 | 0.57 | 1.125 | 0.57 |

EXAMPLE II

Effectiveness of the germicides against mixed organisms plus their effectiveness in the presence of water hardness were demonstrated by the following procedure. Settled sewage was diluted with sufficient distilled water to achieve dilutions containing 23,000 organisms/ml. and 12,000 organisms/ml. Calcium carbonate, normally occurring in hard water and known to combine with germicides such as chlorine to cause their inactivation with resulting mineral precipitation, was added to one series of the two dilutions. The germicidal combination of Example I was added to the sewage dilutions at a dilution of 4.5 p.p.m. and at selected time intervals reduction of organisms was determined:

*Table 2*

| | 23,000 organisms/ml. | | | | | 12,000/ml. | | | | |
|---|---|---|---|---|---|---|---|---|---|---|
| Minutes | 10 | 20 | 30 | 60 | 120 | 10 | 20 | 30 | 60 | 120 |
| Distilled water: | | | | | | | | | | |
| Number surviving | 1,700 | 600 | 210 | 180 | 140 | 1,300 | 340 | 184 | 92 | 69 |
| Percent reduction | 92.4 | 97.4 | 99.1 | 99.2 | 99.4 | 94.5 | 98.5 | 99.2 | 99.6 | 99.7 |
| 210 p.p.m. CaCO$_3$: | | | | | | | | | | |
| Number surviving | 2,100 | 1,000 | 410 | 190 | 160 | 1,600 | 510 | 340 | 230 | 210 |
| Percent reduction | 90.1 | 95.6 | 98.2 | 99.2 | 99.3 | 93.2 | 97.8 | 98.5 | 99.0 | 99.1 |

EXAMPLE III

Using the same germicide combinations at 4.5 p.p.m. as in Example I the procedure of Fitzgerald, Applied Microbiology 7: 205 (1959), was used to evaluate its algicidal activity. In one series the test organisms were suspended in water containing 210 p.p.m. CaCO$_3$. Due to precipitation of phosphate salts in the hard water 0.05 M citrate buffer was substituted for phosphate buffer in Allen's medium.

*Table 3*

| | Phormidium retzii | | | Chlorella pyrenoidosa | | |
|---|---|---|---|---|---|---|
| Time in weeks | 1 | 2 | 3 | 1 | 2 | 3 |
| Germicide in distilled water | *− | − | − | − | − | − |
| Germicide in 210 p.p.m. CaCO$_3$ | − | − | − | − | − | − |
| No germicide (control) | + | + | + | + | + | + |

*− Denotes inhibition. + No inhibition.

Subcultures from the negative cultures showed no viable algae after one week of incubation. It is concluded that the germicide combination is algicidal at this concentration.

EXAMPLE IV

Skin irritating properties of the combination of Example I was determined at a concentration of 4.5 p.p.m. The backs of three New Zealand albino rabbits were closely clipped. One area of the back was abraded. The combination was applied to the abraded and intact back areas. The treated areas were covered with plastic shields to keep the material in contact with the skin. Using the scoring method of Draize et al., J. Pharmacology, Exp. Therap. 82: 377 (1944), evaluation of skin irritation was made at various time intervals. Results appear in Table 4:

*Table 4*

| | Numerical Evaluation After— | | | | | |
|---|---|---|---|---|---|---|
| | 24 hours | | 48 hours | | 72 hours | |
| | Intact | Abraded | Intact | Abraded | Intact | Abraded |
| Animal No. 1 | *0 | 0 | 0 | 0 | 0 | 0 |
| Animal No. 2 | 0 | 0 | 0 | 0 | 0 | 0 |
| Animal No. 3 | 0 | 0 | 0 | 0 | 0 | 0 |

*Score range 0-8 (0—no irritation, 8—maximum irritation).

Application of the germicidal combination produced no visible signs of irritation to the skin of rabbits.

EXAMPLE V

Using the method of Draize et al. (ibid) the degree of ocular irritation resulting from application of the combination of Example I at 4.5 p.p.m. in water was determined in albino rabbits. 0.1 ml. of the dilution was instilled into the conjunctival sac of the right eye of the rabbit. Observations were made at 24 hour intervals for 3 days. Fluorescein straining, 2% aqueous solution, was used to determine ocular damage. It was concluded that the germicide instilled into the conjunctival sac produced no discernible signs of irritation to the eyes of rabbits.

While in the foregoing specification various embodiments of this invention have been described in considerable detail for the purpose of illustration, it will be appreciated by those skilled in the art that this invention is susceptible to other embodiments and that many of these details can be widely varied without departing from the basic concept and spirit of the invention.

We claim:

A germicidal composition comprising a synergistic combination consisting of equal parts by weight of dodecylamine hydrochloride, trimethyltallow quaternary ammonium chloride and octadecylmethyldipolyoxypropylene ammonium methylsulfate.

References Cited in the file of this patent

UNITED STATES PATENTS

| | | |
|---|---|---|
| 2,019,275 | Sharples | Oct. 29, 1935 |
| 2,204,511 | Ralston | June 11, 1940 |

FOREIGN PATENTS

| | | |
|---|---|---|
| 441,120 | Great Britain | Apr. 11, 1934 |

OTHER REFERENCES

Reddish: Antiseptics, Disinfectants, Fungicides, 2nd ed., 1957, pp. 581–585.